UNITED STATES PATENT OFFICE.

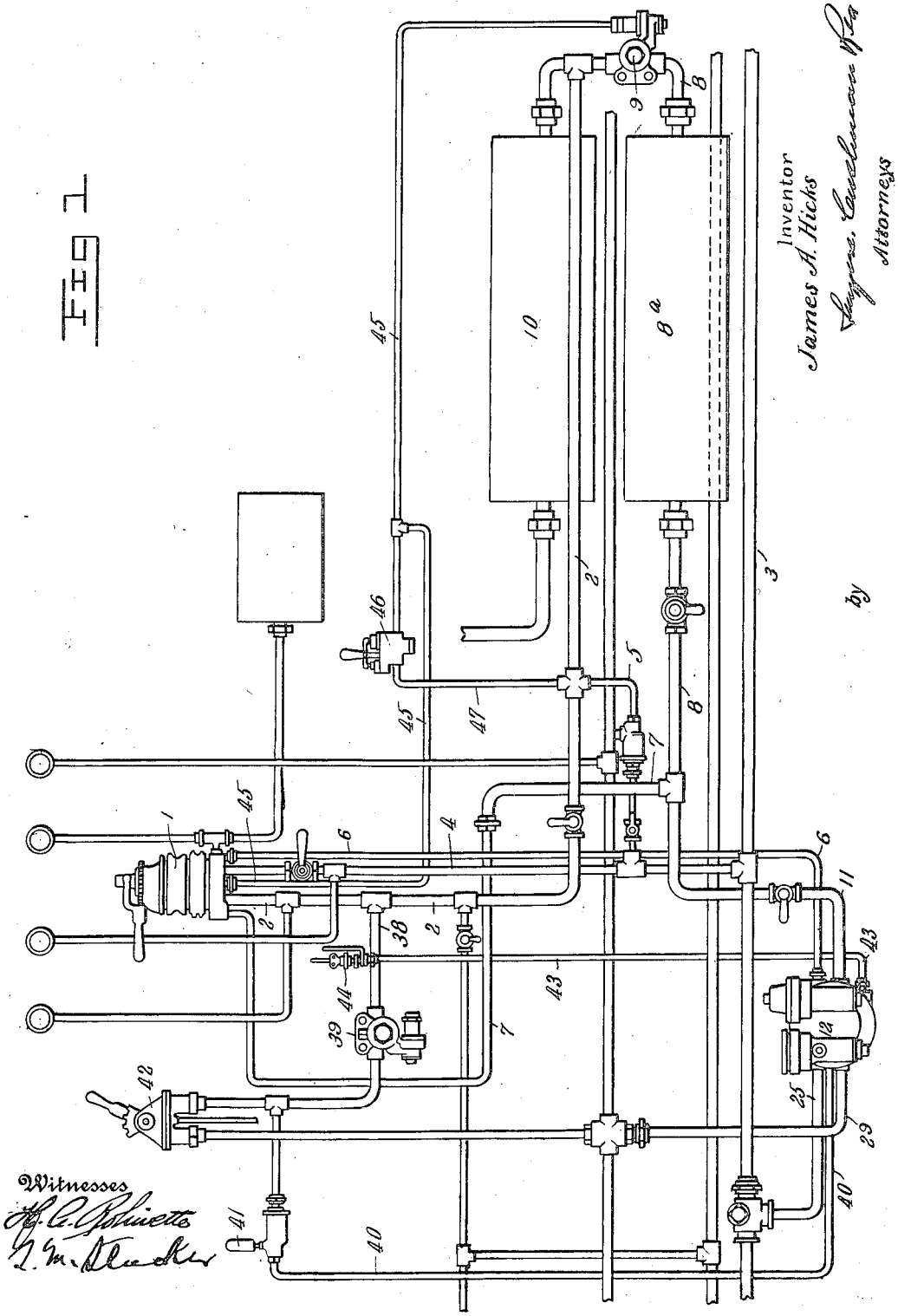

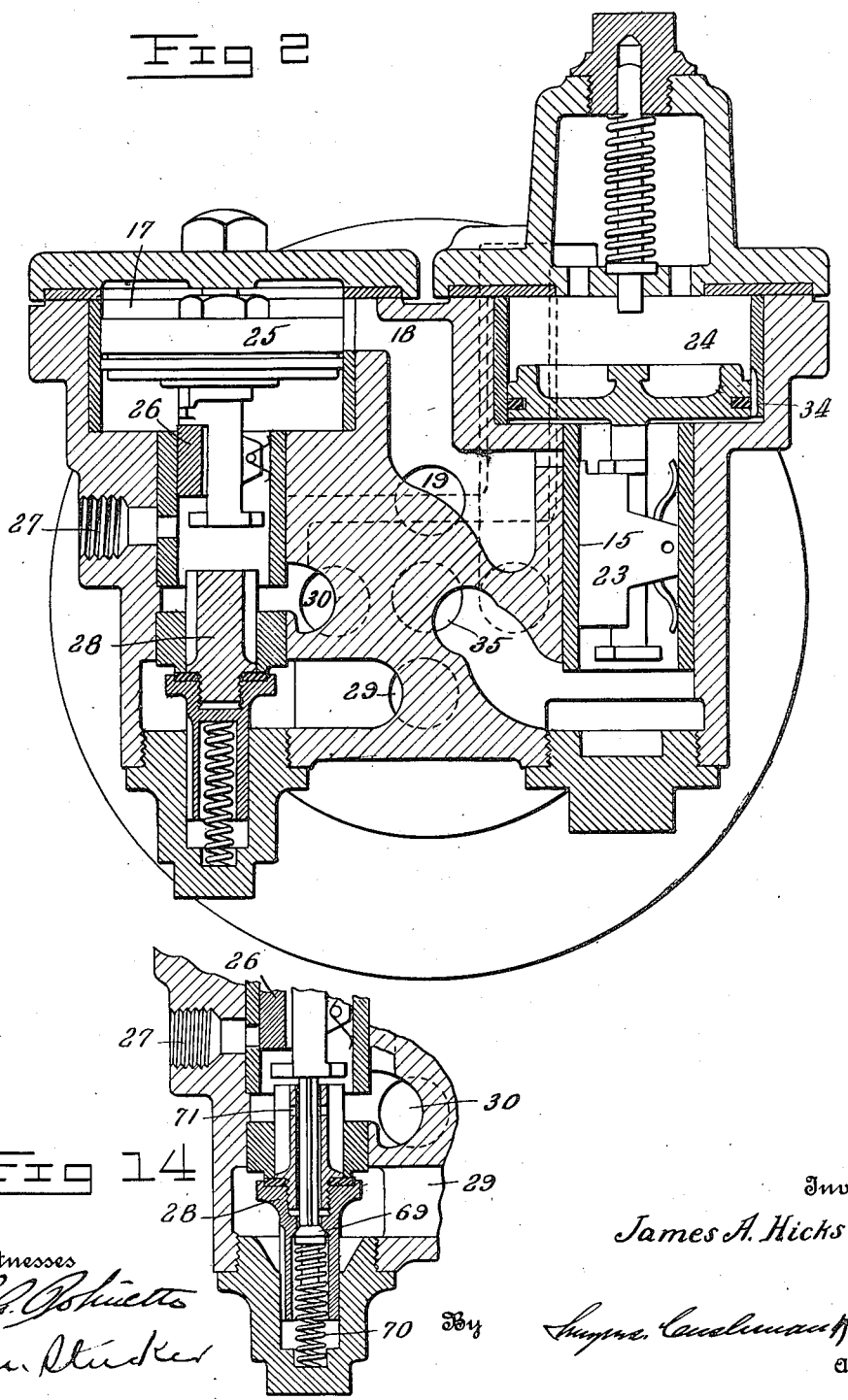

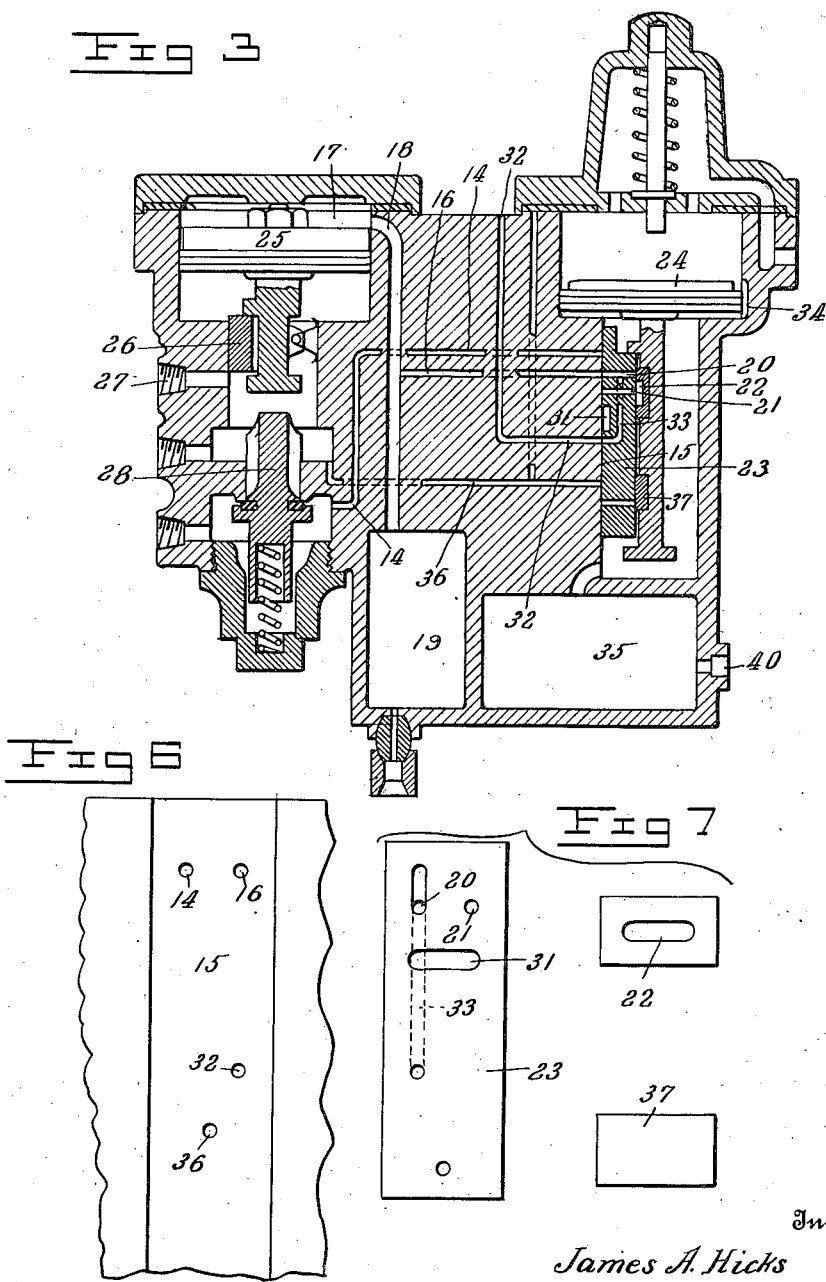

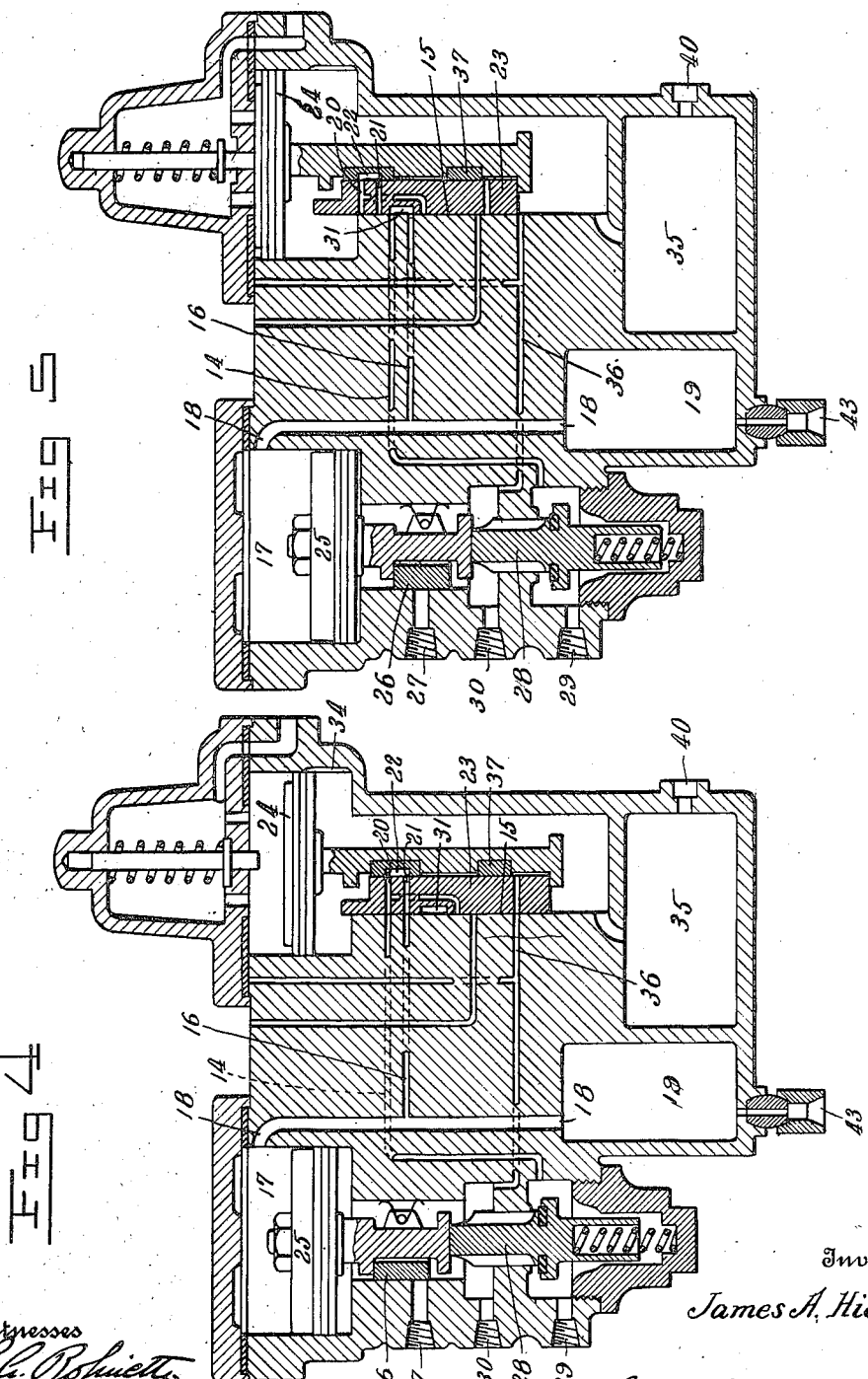

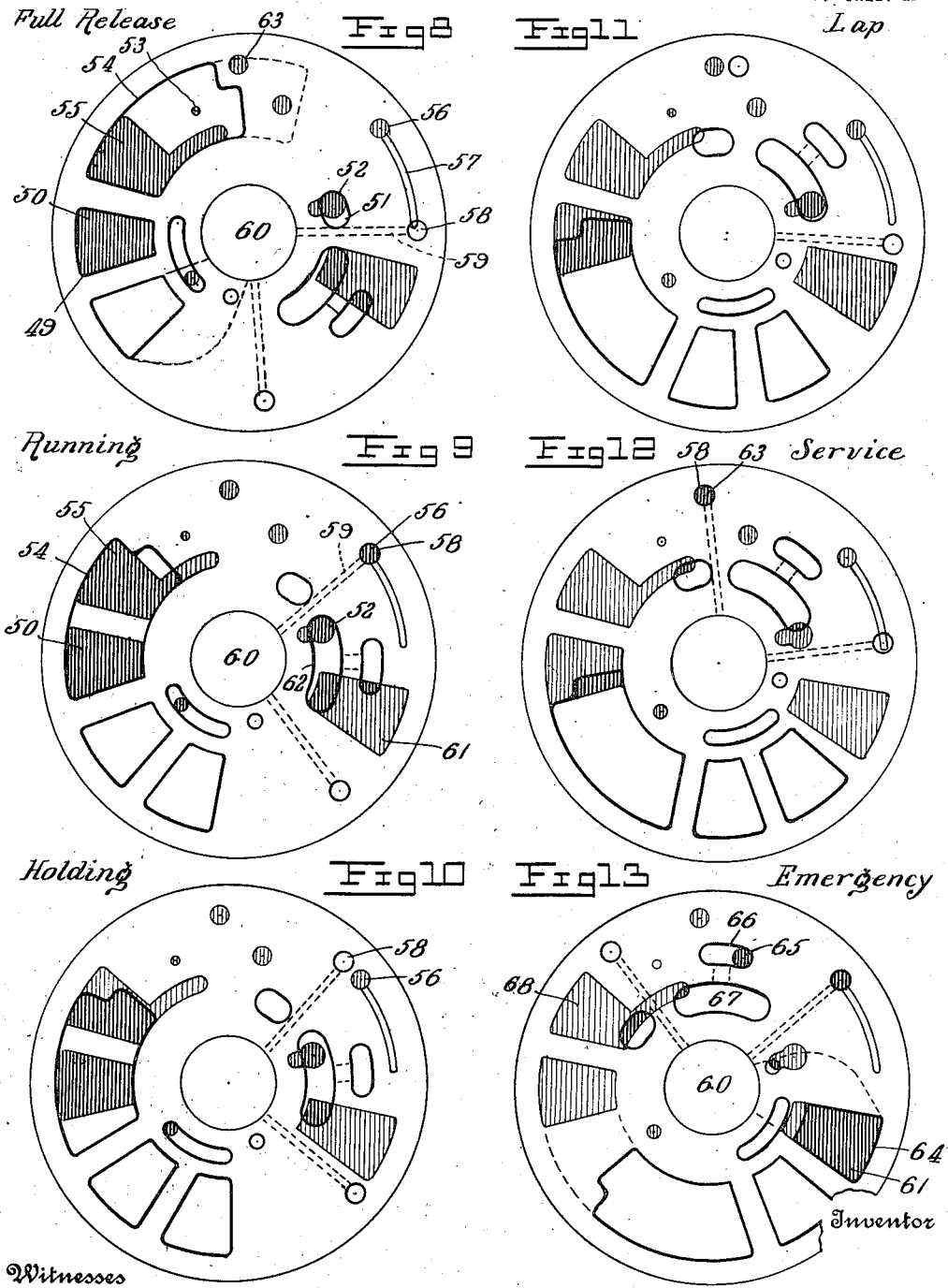

JAMES A. HICKS, OF ATLANTA, GEORGIA.

FLUID-PRESSURE BRAKE SYSTEM.

1,259,737.  Specification of Letters Patent.  Patented Mar. 19, 1918.

Application filed March 31, 1911. Serial No. 618,210.

*To all whom it may concern:*

Be it known that I, JAMES A. HICKS, a citizen of the United States, residing at Atlanta, in the county of Fulton and State of Georgia, have invented new and useful Improvements in Fluid-Pressure Brake Systems, of which the following is a specification.

The present invention relates to fluid-pressure brake systems, and particularly to systems of the type heretofore invented by me, and more particularly those of the type illustrated in my pending application filed March 7, 1910, Serial No. 547,915, to which the present system is closely related, differing therefrom only with respect to certain variations in routing the pressures, the structural arrangement being very similar, and in some respects identical, with the structural disclosure set forth in the aforesaid application.

In fact the present system embodies the generic feature of the systems which I have heretofore invented and which have been made the subject of applications for patent and patents by me, and contemplates only such small departures therefrom as are necessitated by the slightly different routing of the pressures in the present equipment. The equipment is designed primarily for use in that system of train braking which is now in vogue and which was contemplated in my earliest application for patent, Serial No. 310,333, filed October 6, 1906, in which provision was made for the conjoint action of the ordinary automatic braking for the cars of a train and the straight air braking of the locomotive and tender, the two systems being so combined and correlated as that they would work together under the ordinary manipulations of the engineer's valve or rotary, provision being made in some instances whereby they could be manipulated independently of each other.

In the present system, as I have illustrated it in this disclosure, it is proposed to use main reservoir pressure (reduced, if desired, by a suitable feed valve) in the brake cylinders of the locomotive, this main reservoir pressure, whether it be reduced or not, being handled by a control device which will deliver it to the locomotive brake cylinders in proportion to the reduction which may be made in the train pipe pressure upon movement of the engineer's valve to reduce the train pipe pressure and apply the automatic brakes throughout the train, and my present system departs from those which I have heretofore invented only in this respect, that I control the brake cylinder pressure from the main reservoir or pressure supply through a pressure-control piston which is itself subject to pressure from the same main reservoir or other pressure-supply which supplies the brake cylinders, this valve-controlling instrumentality being in turn under the control of a slide valve, or equivalent device, which responds to variations in the train-pipe pressure, so that, if a reduction is made in the train-line pressure, the controlling valve for the brake-cylinder pressure supply will be actuated in the proper proportion to train-line reduction and admit pressure to the brake cylinders in exact ratio to the amount of reduction in train-line pressure.

In order that the invention may be understood by those skilled in the art, I have illustrated in the drawings herewith one embodiment of my invention and that the best now known to me, but as this disclosure is merely illustrative and not restrictive, it will be understood that such variations as would suggest themselves to one mechanically skilled as obvious expedients for the illustrative disclosure here made, are within the range of my invention, and I do not limit myself to the mechanical details set forth.

In the drawings,—

Figure 1 is a diagrammatic view of so much of the piping and control system as will illustrate the adaptation of my invention to a locomotive.

Fig. 2 is a sectional view of the control device or distributer which I have invented.

Fig. 3 is a diagrammatic view, disregarding structure or design, to show the routing of the air pressures in the distributer disclosed in Fig. 2, Fig. 3 showing the device in "release position."

Fig. 4 shows in diagram the distributer in "service position."

Fig. 5 shows the distributer in diagram in "emergency position."

Fig. 6 is a plan view of the slide valve seat of the distributer to show the porting of that seat.

Fig. 7 is a face view of the slide valve which coöperates with the seat shown in Fig. 6, and the graduating valves therefor.

Fig. 8 is a diagrammatic view of the rotary in "full release" position.

Fig. 9 is a diagrammatic view of the rotary in "running" position.

Fig. 10 is a diagrammatic view of the rotary in "holding" position.

Fig. 11 is a diagrammatic view of the rotary in "lap" position.

Fig. 12 is a diagrammatic view of the rotary in "service" position.

Fig. 13 is a diagrammatic view of the rotary in "emergency" position.

Fig. 14 is a sectional view of a slightly different form of control valve.

The general layout of the system in which my control valve is incorporated is shown in Fig. 1, and reference to so much of the system as is necessary to understand the installation and operation of my improvement will now be given.

In Fig. 1, the engineer's valve is designated by the numeral 1, which valve, so far as the ordinary automatic train braking is concerned, is of the usual or any suitable construction, and as this is well understood, no extended reference to it either by way of description or illustration will be made. While the valve 1 in the present instance is shown as a rotary valve of a well known type, it will be understood that an engineer's valve of the slide type may be utilized if desired. The said valve 1 is connected with main reservoir in the usual manner by means of pipe 2.

The said rotary 1 has the usual train pipe connection 4, coupling with train pipe 3 in the customary manner, this train pipe connection 4 from the rotary 1 having a "dead engine" connection 5 with the main reservoir pipe 2.

The rotary valve is provided also with an exhaust pipe 6 for the control device, presently to be described, which pipe 6 communicates with an exhaust passage in the control device.

The rotary 1 has the train line feed pipe 7 which leads from a train-line pressure supply 8 connected through a reducing valve 9 with main reservoir 10, which reservoir is, in turn, connected with the pump (not shown). With this arrangement the danger which now exists in some equipments known to me, of a reapplication of the brakes after the rotary valve has been thrown to "full release" and is then brought to "running" is eliminated. Such reapplication of brakes has been known to occur, and is due to the fact that the feed-up of the train line pressure in "full release" may overcharge the auxiliaries, particularly on some of the forward cars; and then, when the rotary is brought to "running," the feed-up of train line pressure through the reducing valve will not hold up the train line pressure and prevent its dropping to the point where it will pull a triple and throw an auxiliary into action. This failure of the feed-up through the reducing valve in "running" position to hold train-line pressure up to the point where pulling of a triple and re-application of brakes cannot occur, is due to the fact that the excessive pressure on the low pressure side of the reducing valve, attained during "full release" position, prevents such reducing valve from functioning as promptly as is desirable; and again, may result from a foul valve which sticks and opens slowly. By locating the feed valve 9 (see Fig. 1) in the feed-up line at a point where a sufficient volume of air at train-line pressure can accumulate, that is, in train-line supply 8, so that when the rotary is thrown from "full release" to "running," air at train-line pressure will flow from the supply 8 by pipe 7 to the rotary 1 and thence in the usual manner to train line, this difficulty is avoided. Furthermore, the feed will not only be sufficient in volume, but of requisite rapidity, as the contents of train-line supply 8 has a direct route into the rotary 1 and does not pass through the more or less restricted reducing valve as in some systems now in use.

This pipe 7 from train-line supply 8 has a connection 11 leading to the control or application valve passage of the control device 12, presently to be described, a cut-out cock being interposed in the connection 11, at any suitable point, as shown in Fig. 1.

The connection (see Fig. 1) leading from the rotary 1 to the feed or reducing valve 9 has to do with increased feed to the control device 12 of the system in "emergency," and its operation will, therefore, be more appropriately set forth at a later point in this description.

Referring now to the control device, the main reservoir or pressure supply is indicated at 10, as stated, and is fed from a suitable pump or compressor (not shown).

The said main reservoir 10 is connected through a feed valve 9, as stated, with the control device or distributer 12, and preferably, as set forth, I provide between the feed valve 9 and the distributer 12, a reservoir 8ª to insure a sufficient volume of air to answer the needs of the distributer 12, this reservoir 8ª being part and parcel of the train-line supply 8.

The pressure coming through the feed valve 9 is delivered to the distributer 12 by pipe 11, the pressure being divided in the distributer and lead to two connections, the first leading by a suitable port, presently to be described, to the brake cylinders, and the second by a suitable passage 14 (see diagrams, Figs. 3, 4 and 5) goes to the slide valve seat 15, the delivery port for passage 14 in the seat 15 being controlled by a suitable slide valve, as will be hereinafter described.

The pressure coming through the feed valve 9, pipes 8, 11, and passage 14, to the slide valve seat 15, is, in "release" position of the valve, as shown in Fig. 3, cut off, the delivery port in the slide valve seat 15 being blanked by the slide valve, as shown.

The slide valve seat 15 is provided with a port which connects by passage 16 with a piston chamber 17 on the control valve side (the left in Fig. 2 and the diagrams) of the distributer 12 by means of a passage 18, as shown in the diagrammatic views, Figs. 3, 4 and 5, the said passage 18 leading also, if desired, to an enlarged chamber 19 in order to provide increased capacity and an expansion chamber for the piston chamber 17.

In "service" position, as shown in Fig. 4, the passage 14 from the supply is brought into communication with the passage 16 to the piston chamber 17 and the expansion chamber 19 through the ports 20 and 21 in the slide valve, which ports are coupled by the cavity 22 in a graduating valve; so that in this position of the valve, main reservoir pressure, or reduced main reservoir pressure, as the case may be, is delivered past the slide valve to the piston chamber 17 and the chamber 19.

Movement of the slide valve 23 on the slide valve side of the distributer (the right in Fig. 2 and the diagrams) is secured by reduction in train-line pressure above the piston 24 of the slide valve, the piston chamber communicating by a suitable passage with the train-line, and being, therefore, responsive to any variations in train-line due either to movements of the engineer's valve or leakage in train-line because of broken hose or couplings, and it will be obvious that slide valve piston 24 will move in exact proportion to the amount of reduction in train-line.

For example, if the piston 24 respond to a service application, it will move to the position shown in Fig. 4, and this will result in coupling the supply passage 14 and the passage 16 leading to the piston chamber 17, thus putting supply pressure past the slide valve 23 into the piston chamber 17. The piston 25 in the piston chamber 17 will respond to this control-pressure coming past the slide valve 23 and be forced downwardly a distance corresponding to the amount of train-line reduction. The piston 25 carries on its stem a slide valve 26 controlling a brake-cylinder exhaust passage 27, and as the piston 25 descends the brake cylinder exhaust passage is closed. The stem of the piston 25 in its descent engages the stem of a control valve 28 mounted in line with it so as to have a direct travel in the line of piston movement, this valve 28 controlling a port leading from a pressure-supply connection 29 to brake cylinder, the connection 29 coming from any suitable supply, it being shown in the present instance as coming from the connection 11 with main reservoir feed past the feed valve 9, although, obviously, it might come from some other source if desired.

With such a construction it will be seen that movement of the piston 25 and the control-valve 28 will be in proportion to the reduction of train-line, since slide valve 23, being responsive to movements of the piston 24, said slide valve will throw proportionately as much air on to the control piston 25 as is taken out of the train-line.

In the position shown in Fig. 5, which is "emergency" position, it will be observed that the passages 14 and 16 which connect the pressure supply and the piston chamber 17 are connected by means of a cavity 31 which bridges these passages in the valve seat 15, delivering the full power of the pressure supply to the piston chamber 17, opening the control valve 28 to its full extent, and permitting full pressure from the supply passage 29 to be delivered to the brake cylinder passage 30, and this result will be attained whenever the train-pipe pressure in the slide valve piston chamber and its connection goes to "emergency," whether the emergency be caused by manipulation of the engineer's rotary or by destruction of train-line from some accidental cause.

The slide valve piston 24 normally stands in the position shown in Figs. 2 and 3 with the passage 14 blanked, and the passage 16 leading from the control valve piston chamber 17 to a passage 32 through a passage 33 in the slide valve, the passage 32 being an exhaust passage, so that in release position of the distributer the pressure will be relieved in the piston chamber 17 and the chamber 19 through the passages 16, 33 and 32.

Equalization of pressure on opposite sides of the piston 24 is secured in the usual manner by a leakage groove 34 past the piston 24, so that train-line pressure will stand on both sides of the slide valve piston and in the auxiliary chamber 35. The pressure in the auxiliary chamber 35 may, of course, be variously disposed of when the slide valve 23 is moved, but preferably I throw it by means of passage 36 controlled by the slide valve 23, and graduating valve 37, to the brake cylinder passage 30, above the control valve 28, so that such pressure as is present in or fed to the auxiliary chamber 35 will be utilized in the brake cylinders as the distributer goes into action; and, as in my former system, I drop a passage from beneath the cap of the slide valve piston chamber to the passage 36 and thence to the brake cylinder; this passage being designed for use where a quick-action cap is used to throw the train-line above the slide-valve piston to the brake cylinder, as fully set forth in my earlier case.

In order that the auxiliary reservoir 35, to which reference has heretofore been made, may be fed continuously, I provide the connection 38 from the main reservoir pipe 2, past a suitable feed valve 39, by way of pipe 40, to the auxiliary reservoir 35 of the automatic control equipment or distributer 12; and preferably I provide the pipe 40 with a blow-down 41 which may be conveniently placed in the strainer casing conventionally shown in Fig. 1, this blow-down 41 taking care of any possible derangement of the feed valve 39. The connection 38 providing for continuous feed of the automatic control device, will, as in my former system, be preferably provided with an independent control valve 42, connected, as shown and described in my prior application, with the brake cylinder connection to the engine and tender, this valve 42 being of a type now commonly in use and having provision for "release", "lap" and "service" positions, so that, by use of this independent valve 42, the pressure coming from connection 38 past the feed-valve 39, may be directly manipulated with respect to the engine and tender brakes, all as set forth in my prior application.

In order to secure an independent release of the brakes of the engine and tender after an application has been made with the rotary valve 1, without the necessity of changing the position of the rotary or interferring with the train brakes, I provide an independent release connection from the chamber 19 and, by passage 18, from the application piston chamber 17, this connection leading to any suitable control valve by which this independent release may be effected; the present illustration showing a release pipe 43 leading to a release valve 44 of any desired type, so that on operation of the release valve 44 the pressure in chamber 17 may be relieved and the control valve 28 closed; at the same time, through the movement of the exhaust valve 26, opening the brake cylinder exhaust passage 27. I do not limit myself to this particular manner of securing this independent release, as, obviously, the connection 43 might be made with any suitable valve device which would serve to release the pressure in chamber 17 above the piston 25.

It may be desirable, in "emergency" operation of the system, that a higher pressure be thrown into the application piston chamber 17 than is secured during "service" operation of the automatic control device, in order to give a quicker action to the piston 25 and open the control valve 28 to its full extent, and, furthermore, to supply a higher pressure through the connection 29 to the brake cylinders by the brake cylinder passage 30, and in order to secure this increase of pressure in "emergency", I provide the connection 45 leading from the rotary to the controlling piston or diaphragm of the feed valve 9 and arranged to throw pressure onto the feed-valve piston or diaphragm when the rotary is in "emergency", so as to open up the said feed valve and permit increased feed from the reservoir 10 by connections 8, 8ª, to the automatic control device 12. In order that the feed of the valve 9 may be increased independently of the increase secured when the rotary 1 is thrown to "emergency" position, as just described, I preferably interpose in the connection 45, a valve 46, controlling a feed connection 47, which connects main reservoir pipe 2 with the pipe 45, said valve 46 being of such construction that the engineer may open the connection 47, and, by putting pressure from main reservoir pipe 2 on the diaphragm or piston of the feed valve 9, secure the desired increase of feed past this valve 9, and through the connection 8, 8ª, to the control device 12.

Any suitable valve 46 may be used; as, for example, that valve shown and described by me in my application, Serial No. 547,915, heretofore referred to, and as this feature of intermitting the action of the feed valve to give an increased pressure in the control device 12 is shown, described, and claimed in the aforesaid application, I do not claim broadly that feature and combination in this case.

In Fig. 14 I have shown a form of control valve for the brake cylinder pressure which may be advantageously used, and in which the control valve is provided with a small preliminary valve 69 which is normally held to its seat by a spring 70 and by pressure from the pressure-supply, so as to cut off communication between the supply passage 29 and the brake cylinder passage.

The control valve with the preliminary valve 69 are both operated by the stem of the piston 25 which is so mounted with respect to the valves that on its initial movement, when the piston descends, it will open the small valve 69, the stem of which is slightly longer than the stem of the control admitting pressure from the supply 29 to the brake cylinder, suitable passages 71 being provided in the stem of the control valve and the tail of the valve 69 being grooved or otherwise shaped to permit pressure to enter the cap nut below the control valve and pass to the small valve 69, this arrangement permitting an easy operation of the control valve and a proper graduation of pressure, the control valve proper being unseated on further movement of the piston.

The rotary for handling the system hereinbefore set forth is similar to the rotary shown and described in my application, Serial No. 547,915; the layout of the rotary being almost identical with that shown therein.

In the drawings I have shown the seat and valve in diagram, Figs. 8 to 13, inclusive, illustrating the various positions of the rotary, from "full release" to "emergency".

I shall only refer briefly to the rotary construction in order to make clear the functioning of the automatic control device 12 under the manipulation of the rotary, and the usual braking instrumentalities.

The rotary or engineer's valve has, as stated, the main reservoir feed 2 delivering beneath the hood (see Fig. 1) and over the rotary. The rotary has the usual feed port 49 which, in "full release" and "charging" position of the valve (Fig. 8), delivers main reservoir pressure to port 50 in the seat and then by suitable cored passages in the rotary to brake pipe connection 4 and in the usual manner to the train line 3. In this position of the valve the port 51 registers with the equalizing port 52 in the seat and delivers main reservoir pressure to the equalizing chamber above the equalizing piston in the usual manner, closing train line exhaust. Since the system under this "full release" position might be charged to main reservoir pressure, I provide a warning port 53 which, by cavity 54 and port 55, communicates by suitable passage with an exhaust so as to blow and indicate to the engineer that the valve is in "charging" and "release" position.

When in this "full release" position, the train pipe pressure in train pipe 3 is restored, the triples are released and the system recharged. Furthermore, the triple valve of the control device will, when the train line pressure is fed up, be returned to its normal position and the auxiliary reservoir 35 of the control device will be charged.

In my former system when the rotary was in this position of "full release", I provided for holding the engine brakes by blanking the exhaust from the automatic control valve, this exhaust not being opened until the rotary was brought to "running" position, but in the present system, I provide for a retarded release of the engine brakes from the exhaust port 56 which couples with the exhaust connection 6, heretofore referred to, by means of a restricted leakage groove 57 formed in the seat of the rotary and extending from the port 56 to a point where it will be caught by the exhaust port 58 in the valve proper and by the exhaust passage 59 delivered to the central exhaust passage 60 as heretofore.

The retarded release for the engine brakes just described is so disposed with respect to the other ports and passages of the valve as that in the other positions of the valve, the engine brake release will not interfere with the proper performance of the valve in any way, for the only other position of the valve in which the port 56 and groove 57 communicate with the exhaust port 85 in the rotary is in "service" position, and when the valve is in this "service" position it will be observed that the exhaust passage 32 for releasing pressure from the chamber 17 in the control device (see Fig. 4) is blanked by the slide valve, so that the coupling of the ports 56 and 58 by the groove 57 is without effect, and no interference with the operation of the distributer or engine brakes can occur.

By this arrangement of retarded release of the engine brakes in "full release", I am able to avoid any difficulties incident to charging the train pipe and releasing the train brakes while holding the engine brakes at their full capacity, although it will be observed that the braking power is still exerted on the engine and that the release of engine brakes is effected in the present instance at a slower rate than the train brakes.

When the train line has been fed up to the proper point, the handle will ordinarily be brought to "running" position (Fig. 9), although, if it is desired to hold the engine brakes after a "service" application, this may be done by shooting past the "running" position (Fig. 9) to "holding" position (Fig. 10), and the locomotive brakes may then be graduated off by moving from "holding" to "running" position and finally when entire release of the locomotive brakes is desired, the handle will be moved to "running" position, releasing the control device and opening brake cylinder exhaust. In "running" position (Fig. 9), the valve stands with the cavity 54, bridging the feed valve port 55 and the feed port 50, from which connection is made with port 61 to train line, cavity 62 bridging port 61 and equalizing piston port 52, cavity 58 standing over the exhaust port 56 in the seat which is the exhaust for the passage 32 in the control device and through the passage 59, indicated in dotted lines, bringing it into communication with the central cavity 60 in the rotary and from thence to atmosphere by the usual exhaust passage.

As has been stated, the "holding" position (shown in Fig. 10) while permitting feed-up of train-line, blanks the exhaust port 58 on the seat of the valve, and prevents exhaust from the control device and release of engine brakes, if desired. When the valve is moved to "lap" position (shown in Fig. 11), all of the ports will be blanked so that the control device 6 under this position of the valve will be maintained in whatever position it has been brought to and will hold whatever pressure may have been put into the brake cylinders on a "service" application until a release or reapplication may be desired.

Movement of the valve to "service" position will, of course, give the usual brake pipe reduction and since brake pipe reduction affects the control device 12 in exact ratio to train-pipe reduction, the control device will operate and graduate the pressure to engine brakes from the supply in the manner which has heretofore been set forth.

The "service" position shown in Fig. 12, it will be clear, brings the cavity 58 over the exhaust port 63 of the equalizing chamber so as to relieve pressure thereon in the usual manner, allowing the equalizing piston to rise, as is customary, and open the train-line exhaust, the control device responding as heretofore described.

When the rotary is brought to its "emergency" position (Fig. 13) the usual "emergency" application of train brakes occurs, the cavity 64 connecting the train line port 61 in the seat with the central exhaust cavity 60, and in order that in the control device 12 a quick operation may be given to the piston 25 in the chamber 17 and open the control valve 28 to apply the engine brakes, I provide, as heretofore stated, for intermitting the action of the feed valve 9 when the engineer's rotary goes to "emergency", as in my former application, the connection 45 heretofore referred to as leading from the rotary 1 to the feed valve 9, communicating with the port 65 in the seat which, in "emergency" position of the valve, is caught by cavity 66, communicating by a cored passage with cavity 67 which, in turn, bridges the feed pipe port 68, thereby throwing feed pipe pressure to the piston or diaphragm of the feed valve 9 and opening it up to increase feed through the pipe 8 and thence to the control valve.

I claim:

1. In a fluid-pressure brake system, the combination with a main reservoir, engineer's valve, and train pipe; of a distributer for engine and tender brakes controllable from said engineer's valve, said distributer having a pressure connection with said main reservoir, a pressure-supply passage leading to a brake cylinder, a control-valve for said passage, a piston for operating said control-valve, a pressure-supply passage leading directly from the control-valve chamber to a slide valve seat and thence to the top of said piston, a slide valve controlling said piston supply passage, and a piston responsive to variations in train pipe pressure for operating said slide valve.

2. In a fluid-pressure brake-system and in combination, a pressure-supply; a connection from said supply to a brake-cylinder; a control-valve in said connection; a pressure-actuated piston for operating said valve; a brake-cylinder exhaust-valve controlled by said piston; a pressure-connection leading directly from the supply side of said control-valve to a slide valve seat and thence to said piston; an exhaust passage for said piston-chamber; and a slide-valve responsive to variations in train-pipe pressure controlling the pressure and exhaust connections for said valve-operating piston.

3. In a fluid-pressure brake-system and in combination, a pressure-supply; a connection from said supply to a brake-cylinder; a control-valve in said connection; a pressure-actuated piston for operating said valve; a direct connection from said pressure-supply to a slide valve seat and thence to said piston; an exhaust passage for said piston; and a piston-operated slide-valve responsive to variations in train-pipe pressure controlling the supply and exhaust passages to said piston.

4. A distributer for fluid-pressure brake systems having a brake cylinder pressure passage adapted to be coupled with a pressure supply, a pressure control-valve in said passage, a valve operating piston, a second passage leading directly from the supply side of said control valve to the slide valve seat and thence to the top of said piston, and a valve device responsive to variations in train pipe pressure to control said second passage.

5. A distributer for fluid pressure brake systems having a brake cylinder pressure passage adapted to be connected with a suitable supply of pressure, a piston-operated control-valve in said passage, a second pressure passage leading directly from the supply side of said control valve to the slide valve seat and thence to the top of the valve-operating piston, and a piston-operated slide valve responsive to variations in train pipe pressure controlling said second passage.

6. A distributer for fluid pressure brake systems having a brake cylinder pressure passage adapted to be connected with a suitable pressure supply, a piston-operated pressure control-valve in said passage, a second pressure supply passage leading from the supply side of said control-valve to the top of said piston, a piston-operated slide valve responsive to variations in train pipe pressure controlling said second passage, and an independent pressure supply passage controlled by said slide valve leading to the brake cylinder.

7. A distributer for fluid pressure brake systems having a brake cylinder pressure supply passage, a pressure control-valve in said passage, a piston for operating said control-valve, a slide valve responsive to variations in train pipe pressure to control pressure to said piston, and an independent pressure passage leading to the brake cylinder controlled by said slide valve.

8. A distributer for fluid pressure brake systems having a brake cylinder pressure passage adapted to be connected to a suitable pressure supply, a pressure control-valve in said passage, a second pressure passage leading from the supply side of said control-valve and serving to deliver pressure supply to a control-valve piston, a slide valve responsive to variations in train pipe pressure controlling said second passage, and a control valve piston receiving pressure from said second passage, said piston being arranged in line with said control valve.

9. A distributer for fluid pressure brake systems having a brake cylinder pressure passage adapted to be connected with a suitable pressure supply, a pressure control valve in said passage, a piston for actuating said control valve in axial alinement therewith and acting directly thereon, a second passage leading from the supply side of said control valve to a slide valve seat, and thence to the top of said piston to deliver pressure supply thereto, and a piston controlled slide valve responsive to variations in train pipe pressure controlling said second passage.

10. A distributer for fluid-pressure brake systems having a brake cylinder pressure passage adapted to be connected to a suitable pressure supply, a pressure control valve in said passage normally closed by supply pressure, a valve-operating piston in axial alinement with said valve and adapted to open the same against supply pressure, a source of pressure supply for said piston, and a slide valve responsive to variations in train-pipe pressure controlling the pressure supply for said piston.

11. In a fluid-pressure brake-system, and in combination, a main reservoir, an engineer's valve, a distributer for engine and tender brakes, a pressure connection from said main reservoir to said distributer, a reducing valve in said connection, and means effective when said engineer's valve is in "emergency" position to intermit the action of said reducing valve.

12. In a fluid-pressure brake-system, and in combination, a main reservoir, an engineer's valve, a distributer for engine and tender brakes, a pressure connection from said main reservoir to said distributer, a reducing valve in said connection, means effective when said engineer's valve is in "emergency" position to intermit the action of said reducing valve, and a manually operable valve to suspend action of said reducing valve independently of the engineer's valve.

13. In a fluid pressure brake system, the combination with a main reservoir, engineer's valve, and train pipe; of a distributer for engine and tender brakes controllable from said engineer's valve, said distributer having a brake cylinder pressure connection, a control valve in said connection, a piston for operating said control valve, a valve device responsive to variations in train pipe pressure controlling said piston, an independent pressure chamber in said distributer, and a pressure passage from said chamber to the brake cylinder controlled by said train-pipe-pressure actuated valve device.

14. In a fluid pressure brake system, the combination with a main reservoir, engineer's valve, and train pipe; of a distributer for engine and tender brakes controllable from said engineer's valve, said distributer having a brake cylinder pressure connection, a control valve in said connection, a piston for operating said control valve, a valve device responsive to variations in train pipe pressure controlling said piston, an independent pressure chamber in said distributer fed from the train pipe, and a pressure passage from said chamber to the brake cylinder controlled by said train-pipe-pressure actuated valve device.

15. In a fluid pressure brake system, the combination with a main reservoir, engineer's valve, and train pipe; of a distributer for engine and tender brakes controllable from said engineer's valve, said distributer having a brake cylinder pressure connection, a control valve in said connection, a piston for operating said control valve, a valve device responsive to variations in train pipe pressure controlling said piston, an independent pressure chamber in said distributer fed from the train pipe, a pressure passage from said chamber to the brake cylinder controlled by said train-pipe-pressure actuated valve device, and a pressure feed independent of said train pipe feed for said pressure chamber.

16. In a fluid pressure brake system, the combination with a main reservoir, engineer's valve, and train pipe; of a distributer for the engine and tender brakes having a brake cylinder connection with a suitable supply, a pressure operated valve in said connection, a valve device responsive to variations in train pipe pressure to control said pressure operated valve, and an independent brake cylinder pressure supply passage leading from an auxiliary pressure chamber and controlled by said valve device.

In testimony whereof I have hereunto set my hand in presence of two subscribing witnesses.

JAMES A. HICKS.

Witnesses:
    ARTHUR L. BRYANT,
    A. V. CUSHMAN.